(12) United States Patent
Eichelkraut et al.

(10) Patent No.: US 11,609,414 B2
(45) Date of Patent: Mar. 21, 2023

(54) METHOD FOR CALIBRATING A PHASE MASK AND MICROSCOPE

(71) Applicant: Carl Zeiss Microscopy GmbH, Jena (DE)

(72) Inventors: Toni Eichelkraut, Jena (DE); Jörg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 636 days.

(21) Appl. No.: 16/444,071

(22) Filed: Jun. 18, 2019

(65) Prior Publication Data
US 2019/0391378 A1  Dec. 26, 2019

(30) Foreign Application Priority Data
Jun. 21, 2018  (DE) .......................... 102018115001.6

(51) Int. Cl.
*G02B 21/14*  (2006.01)
*G02B 21/36*  (2006.01)

(52) U.S. Cl.
CPC ............. *G02B 21/14* (2013.01); *G02B 21/36* (2013.01); *G02B 21/361* (2013.01)

(58) Field of Classification Search
CPC ............. G02B 21/002; G02B 21/0024; G02B 21/0032; G02B 21/0052; G02B 21/0072;
(Continued)

(56) References Cited

U.S. PATENT DOCUMENTS

| | | | | |
|---|---|---|---|---|
| 7,115,848 B1 * | 10/2006 | Zinter | .................. | G02B 21/244 250/201.3 |
| 7,492,948 B2 * | 2/2009 | Gluckstad | .............. | G02B 27/46 382/210 |

(Continued)

FOREIGN PATENT DOCUMENTS

| | | |
|---|---|---|
| CN | 107221005 A | 8/1995 |
| CN | 107027325 A | 8/2017 |

(Continued)

OTHER PUBLICATIONS

DE Application No. 19180398.0-1020, Search Report, dated Nov. 29, 2019, 7 pages (no english translation).
(Continued)

*Primary Examiner* — John R Lee
(74) *Attorney, Agent, or Firm* — LaBatt, LLC

(57) ABSTRACT

Method for calibrating a phase mask in a beam path of an optical device with the steps: the phase mask is actuated successively with different patterns of grey levels, wherein a first grey level of a first quantity of segments remains constant and a second grey level of a second quantity of segments is varied from one pattern to the next, light of the optical device impinges on the phase mask, at least one part of the total intensity of the light in the beam path is measured downstream of the phase mask for the different patterns, and a characteristic of the measured intensity is obtained in dependence on the second grey level, a relationship between the second grey level and a phase shift, being imprinted by the phase mask, is obtained from the characteristic and an actuation of the phase mask is calibrated based on the obtained relationship.

22 Claims, 3 Drawing Sheets

Figure 1:
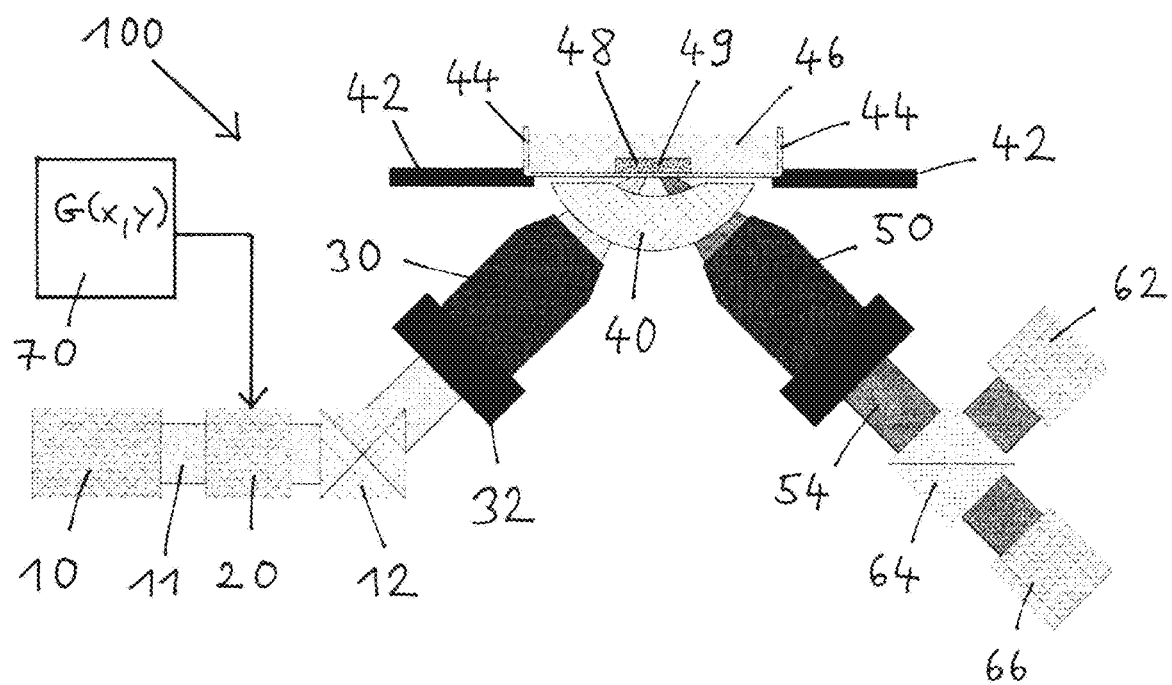

(58) Field of Classification Search
CPC ...... G02B 21/008; G02B 21/06; G02B 21/08;
G02B 21/14; G02B 21/32; G02B 21/36;
G02B 21/361; G02B 26/06; G02F 1/13;
G09G 3/00
See application file for complete search history.

(56) References Cited

U.S. PATENT DOCUMENTS

| | | | |
|---|---|---|---|
| 9,918,053 B2* | 3/2018 | Lo | G09G 3/3648 |
| 9,967,541 B2* | 5/2018 | Piestun | H04N 13/254 |
| 10,222,600 B2* | 3/2019 | Gao | G02B 21/06 |
| 10,317,667 B2* | 6/2019 | Waller | G02B 21/367 |
| 10,444,520 B2* | 10/2019 | Dholakia | G02B 21/0032 |
| 10,791,318 B2* | 9/2020 | Shechtman | G02B 21/0028 |
| 2005/0018295 A1* | 1/2005 | Mendlovic | G06E 3/005 359/558 |
| 2013/0278744 A1 | 10/2013 | Debarre et al. | |
| 2014/0152795 A1 | 6/2014 | Fujii | |
| 2015/0323787 A1 | 11/2015 | Yuste et al. | |
| 2017/0276951 A1 | 9/2017 | Kumkar et al. | |
| 2018/0081159 A1 | 3/2018 | Lippert et al. | |
| 2018/0173004 A1* | 6/2018 | Nikolenko | G02B 27/46 |
| 2018/0267289 A1 | 9/2018 | Kalkbrenner et al. | |
| 2019/0199969 A1* | 6/2019 | Betzig | G02B 21/002 |
| 2019/0391378 A1* | 12/2019 | Eichelkraut | G02B 21/14 |
| 2020/0218050 A1* | 7/2020 | Newman | G02B 21/18 |
| 2020/0218052 A1* | 7/2020 | Hong | G01N 21/00 |
| 2021/0096056 A1* | 4/2021 | Weiss | G01N 15/1475 |
| 2021/0199942 A1* | 7/2021 | Siebenmorgen | G02B 21/367 |

FOREIGN PATENT DOCUMENTS

| | | |
|---|---|---|
| CN | 107941470 A | 4/2018 |
| EP | 2290646 A1 | 3/2011 |
| JP | 2018501513 A | 1/2018 |
| JP | 2018513404 A | 5/2018 |

OTHER PUBLICATIONS

Zhang, Zheng, "Simple Method for Measuring Phase Modulation in Liquid Crystal Televisions," Optical Engineering, Sep. 1994, 5 pages.
Chen Xiao et al, "A Calibration Algorithm for the Voltage-Phase Characteristic of a Liquid Crystal Optical Phased Array," Selected Papers of the Photoelectric Technology Committee Conference, Jun.-Jul. 2015, 6 pages.
M. T. Runyon et al., "Implementation of Nearly Arbitrary Spatially-Varying Polarization Transformations: a Non-Diffractive and Non-Interferometric Approach Using Spatial Light Modulators," Cornell University Library, Feb. 16, 2018, 16 pages.
Office action for European Application No. 19180398.0, dated Jun. 28, 2022, 6 pages (with English translation).
Office action for Chinese Application No. 201910542603.7, dated Jun. 27, 2022, 18 pages (with English translation).
English translation of Office action for Japanese Application No. 2019-114236, dated Jan. 25, 2023, 6 pages.
Dammann et al., "High-efficiency in-line multiple imaging by means of multiple phase holograms", and Optics Communications, Jul. 1, 1971, vol. 3, No. 5, pp. 312-315.

* cited by examiner

METHOD FOR CALIBRATING A PHASE MASK AND MICROSCOPE

The current application claims priority to German Application No. 102018115001.6, filed on 21 Jun. 2019, which is hereby incorporated by reference.

In a first aspect, the invention relates to a method for calibrating a phase mask, in particular an SLM, in the beam path of an optical device, in particular of a microscope. In a second aspect, the invention relates to a microscope, which is suitable in particular for performing the method according to the invention.

A generic microscope for examining a sample comprises the following components: at least one light source for emitting illumination light, at least one microscope objective for guiding the illumination light onto the sample and optical means for guiding detection light from the sample onto a camera, a phase mask arranged in the beam path, the camera for measuring light in a detection beam path, and a control and evaluation unit for controlling the phase mask and the camera and for evaluating light measured by the camera.

In microscopy, structured illumination is required in various areas of use. For example, light-sheet microscopy requires illumination that resembles a thin sheet. That means that what is known as a light sheet is to be generated which is as thin as possible in a first transverse direction, is wide in a second transverse direction, and is as long as possible in the propagation direction of the light. To accomplish this, for example Bessel beams can be coherently superposed. It is additionally known to specifically use interference effects between individual Bessel beams for generating an extended and additionally structured light sheet. Also known are what are referred to as $\text{sinc}^3$ beams, with which a cuboid light sheet in the sample with only minor secondary maxima is possible.

A further field of use for phase masks, in particular spatial light modulators (SLM), is laser scanning microscopy, where a three-dimensional volume is scanned with an illumination focus. In fluorescence microscopy, regions of a sample are deliberately optically bleached in specific techniques. Suitable spatial structuring of the light used for bleaching is likewise necessary here. A prominent use of structured illumination is what is known as super-resolution microscopy, in which the point spread function (PSF) is shaped in a targeted fashion. For example, the point spread function used for the illumination in what is known as the STED method has the shape of a doughnut.

The abovementioned examples of structured illumination can be realized with phase masks, for example spatial light modulators (SLM). In general, there are two different types of SLMs, which differ in terms of the liquid crystals used. Nematic SLMs permit a maximum continuously settable phase deviation of 0 to $6\pi$, but are relatively slow. Generally, they have frame rates of approximately 60 Hz. Special nematic SLMs can have frame rates of up to 500 Hz. Nematic SLMs can be used to attain high diffraction efficiencies of over 90 percent.

Ferroelectric SLMs can switch only between the state with phase deviation 0 and phase deviation $\pi$. The advantage of ferroelectric SLMs is the high speed thereof. Frame rates of up to 4 kHz can be obtained. However, the diffraction efficiency is relatively low at approximately 10 percent.

Both types of SLMs have in common that the attainable phase deviation is dependent on the wavelength of the incoming laser light.

A nematic SLM should be calibrated such that it has a continuous phase deviation of 0 to $2\pi$. This phase deviation, however, can be set only for a design wavelength. As soon as the SLM is irradiated with light of a different wavelength, the phase deviation that is able to be impressed onto said light deviates from $2\pi$. If the wavelength is smaller, the phase deviation becomes larger, and at a larger wavelength, the phase deviation decreases.

The case is similar for a ferroelectric SLM. Here, too, the phase deviation of $\pi$ is attained only for a design wavelength. For wavelengths that deviate therefrom, phase deviations that deviate from $\pi$ are generated.

These properties of the available SLMs have a direct effect on the generation of the above-stated examples of structured illumination. Said beams can be generated optimally only when the phase deviation is either settable continuously from 0 to $2\pi$, for example for Bessel beams and Mathieu beams, or is exactly $\pi$, for example in the case of coherently superposed Bessel or coherently superposed $\text{sinc}^3$ beams.

An SLM is controlled typically via a control and evaluation unit, typically a PC that makes a greyscale image available to the SLM. The grey levels of the individual image points are converted inside the SLM into voltages and thus correspond to the phase deviations of the individual SLM pixels. For example, with a bit depth of 8-bit, the grey level 0 in the image can correspond to a phase deviation of 0, and the grey level 255 can correspond to a phase deviation of $2\pi$. As described above, the SLM can be used optimally only when the wavelength-dependent phase deviation has been correspondingly calibrated. That means for example a table is made available to the SLM that assigns the grey levels the respective voltages that result in the desired phase deviation.

The company Holoeye has described a measurement setup for calibrating an SLM, in which a laser beam is split into two parts and the two partial beam bundles are directed in each case onto a partial region of the SLM that is to be calibrated. Both beams are superposed again on a camera, and the stripe-shaped interference pattern that forms is recorded. Different grey levels are placed onto the two partial regions of the SLM in order to change the relative phase of the two beams and thus to shift the interference pattern on the camera. The shift of the interference maxima on the camera is directly proportional to the relative phase deviation. In this calibration method, the SLM is calibrated for a desired wavelength before the SLM is fixedly installed in an optical device, such as a microscope. Subsequent calibration is no longer possible with this method without removing the SLM from the respective device.

It can be considered to be an object of the present invention to specify a method for calibrating a phase mask in an optical device which is to be performed with particularly low outlay. In addition, a microscope is to be created in which a phase mask present therein can be calibrated without major outlay.

This object is achieved by means of the method having the features of claim 1 and by means of the microscope having the features of claim 16.

Advantageous variants of the method according to the invention and preferred configurations of the microscope according to the invention are described below, in particular in association with the dependent claims and the figures.

In the method according to the invention for calibrating a phase mask in a beam path of an optical device, the following method steps are performed: The phase mask is controlled successively with different patterns of grey levels, wherein a first grey level of a first partial quantity of segments remains constant and wherein a second grey level of a second partial quantity of segments varies from one pattern to the next pattern, the phase mask is exposed to light of the optical device, at least one portion of the total intensity of the light in the beam path is measured downstream of the phase mask for the different patterns, and a characteristic of the measured intensity in dependence on the second grey level is obtained, a relationship between the second grey level and a phase shift that is impressed by the phase mask is obtained from the characteristic and controlling the phase mask is calibrated on the basis of the relationship obtained between grey level and phase shift.

The microscope of the abovementioned type is developed further according to the invention by way of the control and evaluation unit being set up to control the phase mask successively with different patterns of grey levels, wherein a first grey level of a first partial quantity of segments remains constant and wherein a second grey level of a second partial quantity of segments varies from one pattern to the next pattern, to control the camera for measuring at least one portion of the total intensity of the light in the beam path downstream of the phase mask for the different patterns, to form a characteristic of the measured intensity in dependence on the second grey level, to obtain from the characteristic a relationship between the second grey level and the phase shift that is impressed by the phase mask, and to calibrate control of the phase mask on the basis of the relationship obtained between grey level and phase shift.

Phase mask in the meaning of the present description is understood to mean an optical apparatus having a multiplicity of controllable segments which impress a defined phase shift, which is variable in dependence on the control of the corresponding segment, onto respective light that is transmitted or reflected. In principle, phase masks can be used in which the segments are divided only in one spatial direction. One example of this are phase masks having stripe-shaped segments.

With particular preference, phase masks having two-dimensional structuring are used. Such phase masks can be referred to as 2D phase masks and can have in particular a pixel structure with pixel rows and pixel lines. The individually settable or controllable segments of the phase mask are thus individual pixels. The possibilities of beam manipulation in such two-dimensional phase masks are particularly varied.

In principle, ferroelectric SLMs can be used as phase masks. For reasons of variable setting options, nematic spatial light modulators (SLMs) are generally used.

Calibrating a phase mask refers to the process in which a defined assignment of control, for example of a digital control value, to a desired phase deviation of the respectively controlled segment of the phase mask is provided.

Optical devices that are suitable in principle are all devices in which phase masks are used for the controlled and defined micro-influencing of light. The main areas of use of the method according to the invention will be microscopes where in particular the illumination light, but also detection light is to be structured in multifarious ways.

For example, the optical device can be a laser scanning microscope (LSM), a widefield microscope or a light-sheet microscope. Advantageous possibilities of use of the method according to the invention, however, also exist for photo-manipulators for micromanipulation of dyes as optical devices.

The term grey level within the meaning of the present description refers to the control value which is given to a specific segment of the phase mask. In particular, this can be a digital control value, for example with a bit width of 8 bit. This value can accordingly assume values from 0 to 255. Controlling means that a specific control value is given to a specific segment or a specific pixel. Said pixel is thereby placed in a state in which it impresses a specific phase deviation onto transmitted or reflected light. The extent of this phase deviation for a specific control value is initially not clear. It is the purpose of the method according to the invention to ascertain this.

Patterns of grey levels are understood to mean specific combinations of control values for the different segments, in particular pixels, of the phase mask used.

A partial quantity of segments is understood to mean a specific subset of segments, which can in principle be distributed as desired on the phase mask and in particular do not need to be adjacent.

The term light of the optical device with respect to the description of the present invention means light that is to be manipulated by the phase mask during operation of the optical device. For example, for the case of microscopes this means the illumination light which impinges on a sample.

According to the invention, the aim is to measure at least one portion of the total intensity of the light in the beam path downstream of the phase mask for the different patterns. This means in particular that a portion of the beam cross section is evaluated in terms of intensity. In particular, the portion of the total intensity can be the light of at least one order of diffraction, for example the zero or first order of diffraction.

The term characteristic of the measured intensity in dependence on the second grey level refers to the entirety of the value pairs (set second grey level, intensity measured for said grey level).

It is essential for the calibration to ascertain the actual relationship between a specific set grey level and a phase shift which has actually been caused by said grey level. Knowing this relationship ultimately makes it possible to calibrate the control of the phase mask on the basis of just that relationship obtained between grey level and phase shift.

A significant advantage of the present invention can be considered the fact that the phase masks can in principle also be calibrated in a state where they are mounted in the respective optical device, that is to say in particular in a microscope. Such subsequent calibration may become necessary for example when a microscope is operated at different temperatures or when a control unit of the SLM, for example an FPGA (Field Programmable Gate Array), must be replaced due to a defect. Ageing of an SLM can also change an initial relationship between grey level and phase deviation, as a result of which recalibration may likewise become necessary. These subsequent calibrations can be performed using the method according to the invention and in the case of the microscope according to the invention without the need to remove the respective phase mask. A further significant advantage of the present invention in this connection is also the fact that complex adjustments in the beam path of the optical device are not necessary because the phase mask to be recalibrated does not need to be removed.

For the utilized patterns which are impressed on the phase masks, there is in principle a great amount of freedom. What is significant is that the control for a first group or partial quantity of segments is not changed and that the control for a second partial quantity of segments is changed from one pattern to the next pattern.

In principle, the patterns can also be non-periodic. With particular preference, however, the patterns are periodic at least in one spatial direction in the plane of the phase mask.

For example, the set patterns of grey levels can be patterns for producing a Dammann grating.

In particularly preferred variants of the method according to the invention, the second grey level is varied over an entire dynamic range of the phase mask. Preliminary works that have led to the present invention have shown that the calibration can then be performed on the basis of comparatively simple mathematical relationships.

In principle, for the purposes of the calibration, separate beam deflection means may be present with which the illumination light that is used for the measurements for calibration is guided to the camera.

In an alternative variant, in particular in a laser scanning microscope or in a widefield microscope, a special fluorescent sample can be used for the measurements for calibration.

To implement the method according to the invention, however, it is in principle sufficient if light, which was influenced by the phase mask, reaches the camera or a detector in some way. In a particularly preferred variant of the method according to the invention, light reflected at an object carrier for the measurements for calibration are used accordingly. The measures necessary for the performance of the calibration measurements are then very uncomplicated.

Expediently, for the measurements for calibration, any filters that may be present for blocking excitation light in the detection beam path are removed from the beam path. The invention has recognized that the relationship between grey level and phase shift can be ascertained relatively easily in a particularly preferred variant of the method according to the invention, in which downstream of the phase mask light of the zero order of diffraction is blocked using a spatial filter and subsequently downstream an integrated intensity of the beam path is measured by the spatial filter. The relationship between the second grey level and the phase shift can then be obtained by a comparison to $$I=\text{const}*(1-\cos\varphi)$$

In a corresponding variant of the microscope according to the invention, a stop for blocking light of the zero order of diffraction is present downstream of the phase mask.

A similarly simple relationship exists if for the calibration only light of the zero order of diffraction is measured. The relationship between the second grey level and the phase shift can then be obtained by a comparison to $$I=\text{const}*(1+\cos\varphi)$$

A corresponding exemplary embodiment of a microscope according to the invention is characterized in that a stop for blocking light of orders of diffraction of greater than 0 is present.

In principle, a separate camera may be present, which is used only for the measurements for the calibration of the phase mask.

A particular advantage of the invention, however, is that the camera that is also used for the actual microscopy measurements can be used for measuring the intensity. The outlay in terms of apparatus for performing the calibration measurements is thus very low.

The microscope according to the invention can be set up in particular for carrying out the method according to the invention.

If the intention is to provide structured illumination with the phase mask in the form of, for example, an intensity grid, the phase mask is expediently arranged in a plane that is optically conjugate to a sample plane. Such a construction is useful for example in a widefield microscope. The microscopy data obtained can be subjected to an SIM or Apotome calculation. For example, a stripe-shaped phase pattern can be shown on the SLM, which pattern consists of lines that have a grey level of 0 and 128 in alternation. In an ideally calibrated SLM, this corresponds to a phase deviation of 0 or π. By removing the laser block filters, the back reflection can be measured. The back reflection can here also originate from a separate mirror or from an object carrier or cover slip. Alternatively, a fluorescent sample, for example a thin fluorescent layer, can also be used.

In different applications, phase masks for wavefront manipulation are used. For example, aberrations can be corrected. For these purposes, the phase mask is preferably arranged in a plane which is optically conjugate to a rear objective pupil.

Figure 2:
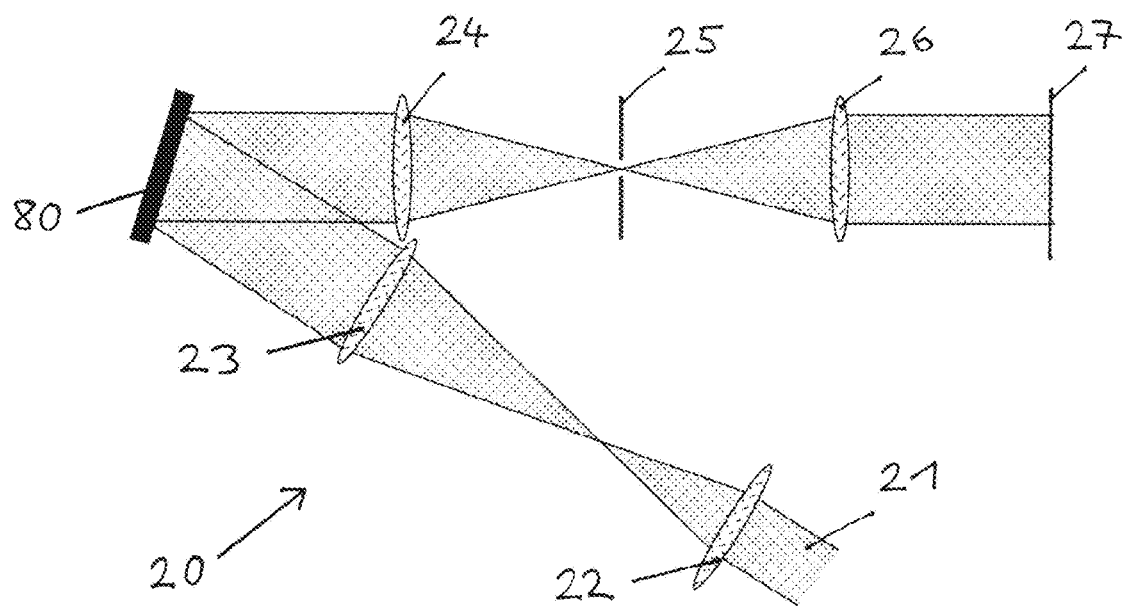
Figure 3:
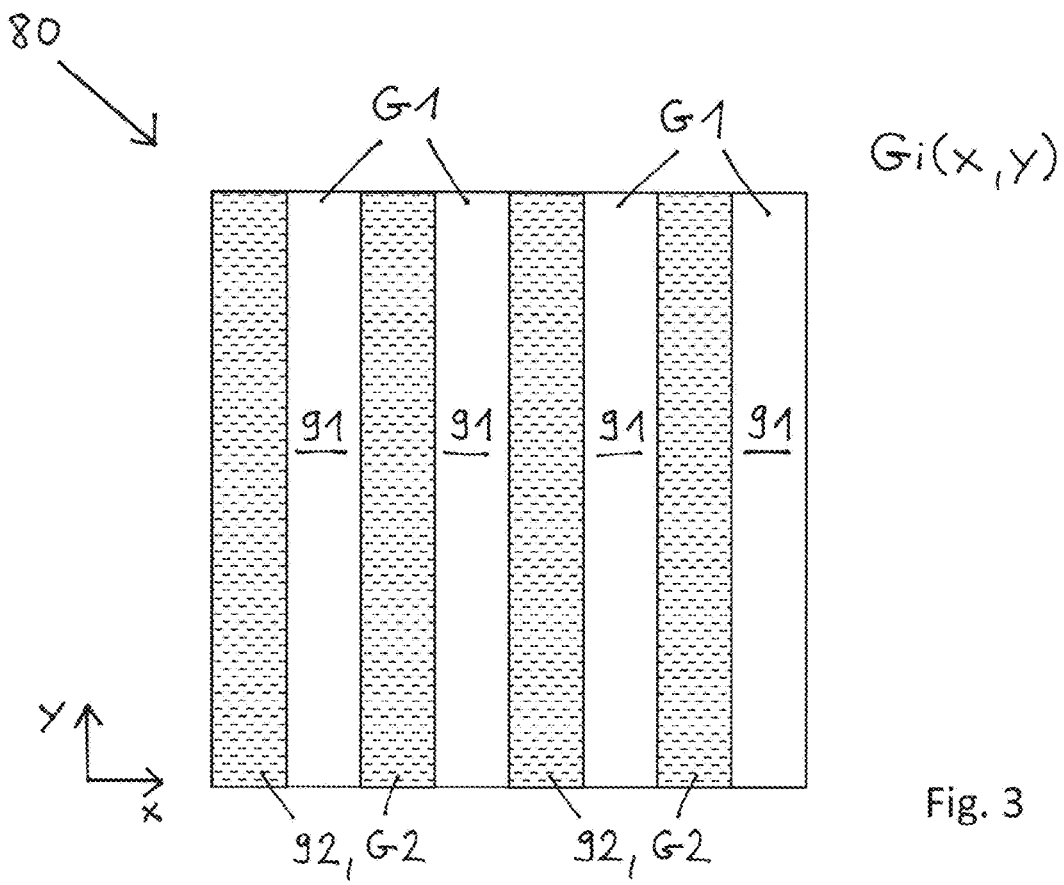
Figure 4:
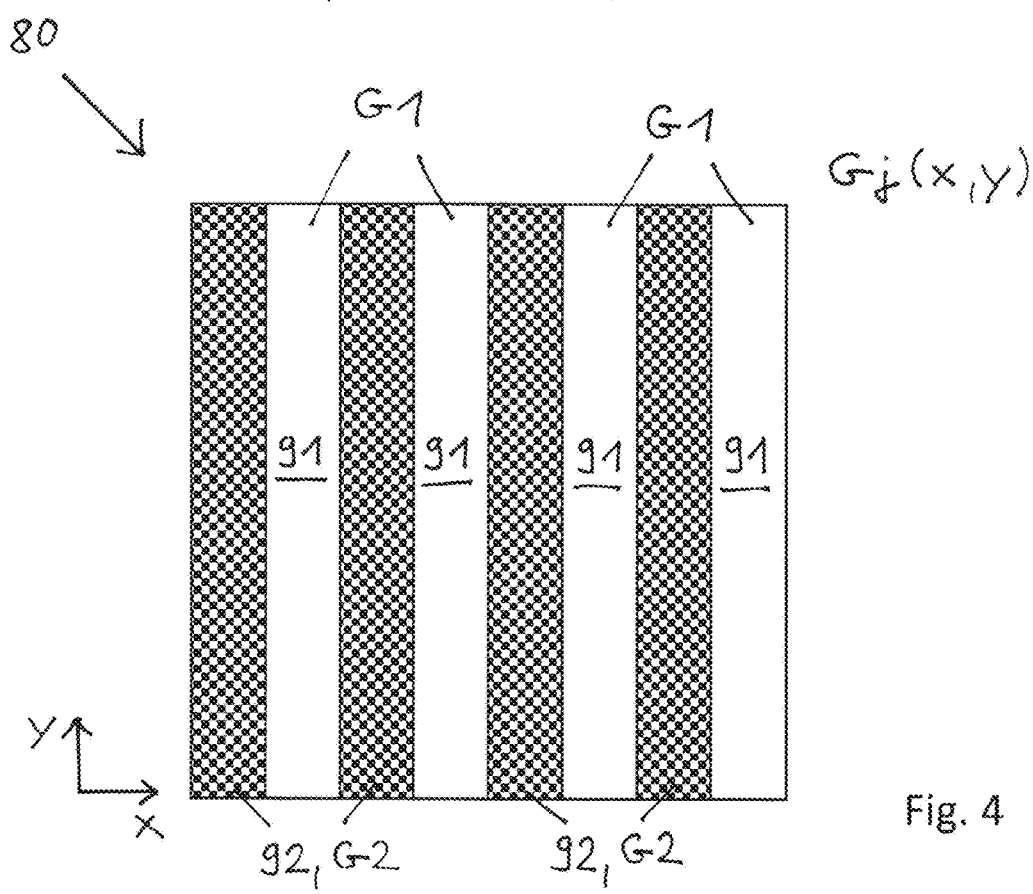
Figure 5:
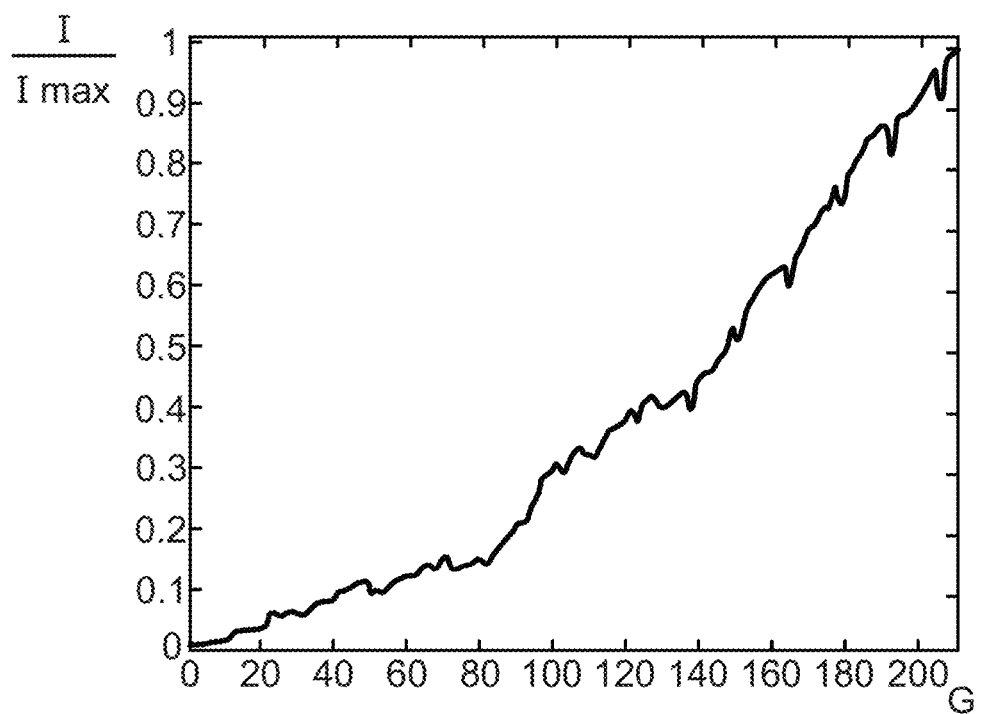
Figure 6:
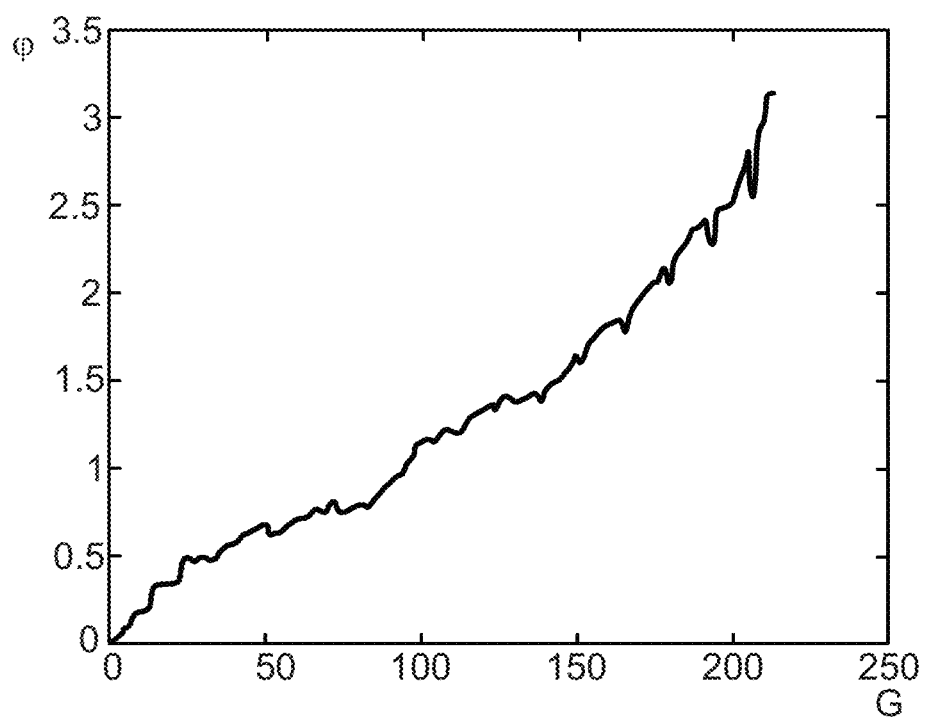

Further advantages and features of the present invention are discussed below with reference to the attached figures. In the figures:

FIG. 1: shows a schematic illustration of a microscope according to the invention;

FIG. 2: shows a schematic illustration of a beam path in a beam-shaping module of a microscope according to the invention;

FIG. 3: shows a first schematic illustration of an exemplary phase mask for explaining the method according to the invention;

FIG. 4: shows a second schematic illustration of the phase mask from FIG. 3 for explaining the method according to the invention;

FIG. 5: shows a first diagram for explaining the method according to the invention and FIG. 6: shows a second diagram for explaining the method according to the invention.

One exemplary embodiment of a microscope 100 according to the invention and variants of the method according to the invention will be described with reference to FIGS. 1 to 6. Identical components and components having an equivalent effect are generally denoted by the same reference signs in the figures.

FIG. 1 schematically illustrates an inverted light-sheet microscope, which comprises, as essential components, first a light source 10, for example a laser module, for emitting illumination light 11, a microscope objective 30 for guiding the illumination light 11 onto a sample 48 that is to be examined, and further optical means 40, 50, 64 for guiding detection light 54 from the sample 48 onto a camera 62, 66. In order to generate the beam shape of the illumination light 11 that is suitable for light sheet microscopy, a beam-shaping module 20 is present, which is arranged immediately downstream of the light source 10.

Using a scanner 12, the excitation light 11 then passes into the microscope objective 30 and, from here, via a meniscus lens 40 onto the sample 48. The sample 48 in the example illustrated in FIG. 1 is situated in a tray-like object carrier 44, which is transparent both for the excitation light 11 and for the detection light 54, which is emitted by the sample 48 upon irradiation with excitation light 11, in particular fluorescent light. The sample 48 can be surrounded by water 46. The object carrier 44 is held by a sample stage 42, which can be positioned in particular in a known manner in all three spatial directions x, y, z. In the example shown, the light sheet is emitted onto the object carrier 44 at an angle of 45 degrees with respect to the normal direction of said object carrier 44.

A piezo mechanism 32 is present for positioning the microscope objective 30 in a direction along the optical axis thereof.

The detection optical unit includes as essential components the meniscus lens 40 and the detection objective 50. Again, a piezo mechanism 52 is present for positioning the detection objective 50. After the detection light 54 has passed through the detection objective 50, it is incident on a beam splitter 64 and then falls either onto a first camera 62 or onto a second camera 66. The beam splitter 64 can be, for example, a colour splitter, with the result that different dyes can be observed in each case with the first camera 62 and the second camera 66.

The construction of the beam-shaping unit 20 with further details is illustrated in FIG. 2. The incoming light 21, which can have in particular a Gaussian beam profile, first falls onto a first cylindrical lens 22, which, together with a second cylindrical lens 23, forms a first telescope. A phase mask 80, in particular a nematic SLM, is arranged in a collimated part of the beam path. After reflection at the phase mask 80, the light finally passes via a fourth lens 24 and a fifth lens 26, which form a second telescope, to the exit plane 27. A stop 25 is located between the third lens 24 and the fourth lens 26. The stop 25 can in particular be a stop in the shape of a circular disc, with which only the zero order of diffraction in the central region of the beam profile is blocked. In an alternative variant, the stop is a pinhole, which only allows the zero order of diffraction through. The phase mask is arranged in a plane that is optically conjugate to the exit plane 27. For the exemplary embodiment illustrated in FIG. 1, this is preferably an intermediate image plane. That means that the plane 27 is optically conjugate to the sample plane of the microscope objective 30.

In principle, the beam-shaping module 20 can also be positioned in a microscope such that the plane 27 and consequently the plane in which the phase mask 80 is arranged are located in pupil planes, that is to say in planes which are conjugate to a rear objective pupil.

For actuating the SLM 80, a control and evaluation unit 70, typically a PC, is present in the case of the microscope 100. Using the control and evaluation unit 70, the phase mask 80 can be actuated with different patterns Gi(x,y), Gj(x,y) of grey levels G.

In the method according to the invention for calibrating the phase mask 80, the following steps are now performed: the phase mask 80 is actuated in temporal succession with different patterns Gi(x,y) of grey levels G. A first grey level G1 of a first partial quantity 91 of segments remains constant here, and a second grey level G2 of a second partial quantity 92 of segments is varied from one pattern Gi(x,y) to the next pattern Gj(x,y). This will be explained in more detail with reference to the schematic FIGS. 3 and 4. FIGS. 3 and 4 in each case show one and the same phase mask 80, but actuated in each case with different patterns of grey levels. In FIG. 3, the phase mask 80 is actuated with the pattern Gi(x,y) and in FIG. 4 with the pattern Gj(x,y). The patterns Gi(x,y) and Gj(x,y) each have a regular stripe shape, that is to say they are periodic in the x-direction. In principle, such a pattern could be realized with a phase mask having stripe-shaped segments. However, 2D phase masks with pixels in rows and columns are generally used. For example, SLMs with resolutions of up to 1280×1024 are available.

The patterns Gi(x,y) and Gj(x,y) are characterized in that the grey level of a first partial quantity 91 of segments does not change. That means that the regions 91 in FIG. 3 and FIG. 4 in each case have the same grey level G1. The second grey level G2 with which the segments of a second partial quantity 92 are actuated, in contrast differs in the case of the pattern Gj(x,y) from FIG. 4 as compared to the pattern Gi(x,y) from FIG. 3. This is schematically illustrated by different hatching of the regions 92 in FIGS. 3 and 4.

However, it is not necessary for a periodic pattern to be given to the phase mask. Any desired aperiodic patterns can also be used, because higher spatial frequencies are also contained in such patterns and bring about the desired diffraction effects.

One possibility for carrying out the method according to the invention with the construction schematically shown in FIG. 1 is to couple the light beam modulated with the aid of the phase mask 80 (in the example described this is a light sheet) directly into the detection beam path with a deflection mirror 49, which is arranged at the same location as the sample 48, and thus to image the light sheet directly onto one of the cameras 62, 66.

Rather than the deflection mirror 49, a special fluorescent sample 48 can be used.

An even simpler possibility which is effective even entirely without additional components in the microscope is that of using a reflection at the object carrier 44. Due to the above-described geometry, the light of the light sheet is reflected at the object carrier 44 directly into the detection objective 50.

In principle it is also possible to couple the beam out of the beam path before it enters the sample 48 or before it is incident on the object carrier 44 and to direct it onto a separate camera. Such a separate camera could also be permanently mounted in the microscope, wherein the output coupling in the direction of said separate camera could be effected with the aid of a beam splitter.

If, as described above, the zero order of diffraction is blocked, that is to say if the stop 55 is a stop in the shape of a circular disc, only higher orders of diffraction interfere on the camera 62 or 66 and a periodic intensity grid is visible. However, this intensity grid on the camera as such plays no role for the actual calibration. What is significant is that the intensity I of the entire light falling onto the camera is measured. This is the total intensity of the beam path minus the blocked light of the first order of diffraction. In accordance with the invention, these intensities are then measured for a multiplicity of different patterns Gi(x,y), wherein, as described, the first grey level G1 of a first partial quantity 91 of segments remains constant and the second grey level G2 of a second partial quantity 92 of segments is changed.

With particular preference, the second grey level G2 is varied over the entire dynamic range of the phase mask 80.

A characteristic I(G2) of the measured intensity (I) is obtained from the measurement data in dependence on the second grey level (G2). FIG. 5 shows an example of such a characteristic, in which the intensity normalized to the maximum value Imax is plotted against the grey level G2.

For the total intensity of the light that is incident on the camera 62 or 66:

$$I = \mathrm{const}(1 - \cos \varphi),$$

wherein $\varphi$ is the phase shift that is actually imprinted by the phase mask 80. With this relationship, it is possible to obtain from the intensity measured in dependence on G2 the phase shift $\varphi$ in dependence on the second grey level G2. The dependence of the phase shift $\varphi$ on the set grey level G2 is shown for the measurement data of FIG. 5 in the diagram in FIG. 6, where the phase shift $\varphi$ is plotted against the grey level G. FIG. 6 can be considered to be a result of the calibration of the phase mask 80 and in principle provides the desired information as to how the phase mask 80 must be actuated for a specific desired phase deviation φ to be achieved. For example, the information of FIG. 6 can be stored in a table in the control and evaluation unit 70.

To implement the method according to the invention, it is not necessary to block the zero order of diffraction. When the total intensity of the beam including the zero order of diffraction is measured, instead of the total intensity falling onto the camera, the modulation depth of the intensity, that is to say the difference between maximum and minimum intensity, in the camera image must be measured.

It is then also possible to use exclusively the light of the zero order of diffraction for the measurement. The measured intensity I is then related to the phase shift φ as follows:

$$I = const(1 + \cos \varphi).$$

Finally, the phase mask 80 does not necessarily have to be located in an intermediate image plane. In principle, the phase mask 80 can be located in any desired plane. For example, if the phase mask 80 is positioned in a pupil plane, the spatial frequency spectrum of the pattern of the grey levels can be seen on the camera. The intensity measurement in this case is performed for example exactly in the image region of the camera that corresponds to the first order of diffraction or, as described above, to the zero order of diffraction.

In principle, the measurement data from FIG. 6 can be used in further calculations, for example to what are known as gamma values, and be programmed directly into the SLM actuation. These further steps, however, no longer concern the actual calibration method, but the implementation in a special device.

Similarly as described in connection with FIG. 1 for a light sheet microscope, the method according to the invention can also be used in a laser scanning microscope, in which an SLM is used for beam shaping. The SLM can here in principle also be positioned in an intermediate image plane. However, the SLM in a laser scanning microscope is typically arranged for wavefront modulation in a pupil plane. If the filters that ensure during the actual measurement operation that no excitation radiation reaches the camera are removed from the detection beam path, the back reflection can be measured. The back reflection can here originate from a specially mounted mirror or, as described above for the light-sheet microscope, from the object carrier. Alternatively, a special fluorescent sample, for example a thin fluorescent layer, can also be used here.

In a laser scanning microscope, it is possible to use in particular patterns with which Dammann gratings are produced as the patterns for the grey levels. By modulating the grey level and measuring the intensities of at least one order of diffraction in dependence on the grey level, the phase shift in dependence on the grey level can be determined as described above from the relationship $$I = const(1 + \cos \varphi)$$

The phase mask, in particular the SLM, can also be part of a photomanipulator used for the targeted switching on and off of dyes, for example in a nucleus.

To correct aberrations, the phase mask, in particular the SLM, can also be used in the detection beam path. For example, the SLM can be positioned in a pupil used both by the illumination beam path and the detection beam path. The method according to the invention for calibrating the SLM can then be carried out as described in connection with FIG. 1. If the SLM is located in a pupil which is used only by the detection beam path, it is possible, as in the laser scanning microscope, to measure a back reflection, for example from the object carrier, by removing laser block filters. Focusing onto the object carrier can be effected here both from the illumination and the detection side. In this case, the SLM in the pupil is fully lit. If the SLM is actuated with a periodic pattern, the spatial frequency spectrum of said pattern can be seen again on the camera. As described above, the intensity of the first order of diffraction can be measured and used for calibrating the SLM.

The present invention is used to provide a novel method for calibrating phase masks, in particular in microscopes. The essential advantage of this method is the fact that it can in principle also be used in an operational apparatus without the need to remove the SLM, that is to say in situ. Complicated adjustment efforts on the optical unit are therefore no longer necessary.

LIST OF REFERENCE SIGNS

10 Light source
11 Illumination light/excitation light
12 Scanner
20 Beam-shaping unit
21 Incoming beam bundle, in particular Gaussian beam
22 First lens, for example cylindrical lens
23 Second lens, for example cylindrical lens
24 Third lens
25 Pinhole
26 Fourth lens
27 Plane that is optically conjugate to the plane of the phase mask
30 Microscope objective
32 Piezo mechanism
40 Meniscus lens
42 Sample stage
44 Object carrier
46 Water
48 Sample, in particular fluorescent sample
49 Separate beam deflection means
50 Detection objective
52 Piezo mechanism
54 Detection light
62 Camera
64 Beam splitter
66 Camera
64 Beam splitter
70 Control and evaluation unit
80 Phase mask
91 First partial quantity of segments
92 Second partial quantity of segments
100 Microscope
G Grey level
G1 First grey level
G2 Second grey level
Gi(x,y), Gj(x,y) Different patterns of grey levels G
I Measured part of the intensity of the light in the beam path
I(G2) Characteristic of the measured intensity in dependence on the second grey level G2
LSM Laser scanning microscope
SLM Spatial light modulator
φ(G) Relationship between the second grey level G2 and a phase shift φ, which is imprinted by the phase mask 80

The invention claimed is:

1. Method for calibrating a phase mask in a beam path of a microscope for examining a sample, wherein the microscope has at least one light source for transmitting illumination light, at least one microscope objective for guiding the illumination light onto the sample, and optical means for guiding of detection light from the sample onto a camera, wherein the phase mask to be calibrated is arranged in the beam path of the microscope, in which the following method steps are performed:

the phase mask is actuated successively with different patterns of grey levels, wherein a first grey level of a first partial quantity of segments remains constant, and wherein a second grey level of a second partial quantity of segments is varied from one pattern to the next pattern, at least one part of the total intensity of the light in the beam path is measured downstream of the phase mask for the different patterns and a characteristic of the measured intensity is obtained in dependence on the second grey level, a relationship between the second grey level and a phase shift, which is imprinted by the phase mask, is obtained from the characteristic and an actuation of the phase mask is calibrated on the basis of the obtained relationship between grey level and phase shift, wherein, for the calibration measurements, the phase mask is subjected to light from the light source, and wherein a special fluorescent sample is used for the measurements for the calibration and/or light reflected at an object carrier for holding the sample or a cover slip is used for the measurements for the calibration.

2. Method according to claim 1,
wherein
the phase mask is a 2D phase mask with pixel rows and pixel lines.

3. Method according to claim 1,
wherein
the phase mask is a spatial light modulator.

4. Method according to claim 3,
wherein
the phase mask is a nematic spatial light modulator.

5. Method according to claim 1,
wherein
the patterns are periodic in at least one spatial direction.

6. Method according to claim 1,
wherein
the patterns are patterns for producing a Dammann grating.

7. Method according to claim 1,
wherein
the second grey level is varied over the entire dynamic range of the phase mask.

8. Method according to claim 1,
wherein
the illumination light used for the measurements for the calibration is guided via separate beam deflection means to the camera.

9. Method according to claim 1,
wherein
filters for blocking excitation light in the beam path are removed for the measurements for the calibration.

10. Method according to claim 1,
wherein
light of the zero order of diffraction is blocked using a spatial filter downstream of the phase mask,
wherein an integrated intensity of the beam path is measured downstream of the spatial filter and
wherein the relationship between the second grey level and the phase shift is obtained by a comparison with $I=\text{const}*(1-\cos\varphi)$.

11. Method according to claim 1,
wherein
only light of the zero order of diffraction is measured for the calibration and
wherein the relationship between the second grey level and the phase shift is obtained by a comparison with $I=\text{const}*(1+\cos\varphi)$.

12. Method according to claim 1,
wherein
a separate camera is present, which is used only for the measurements for the calibration of the phase mask.

13. Method according to claim 1,
wherein
a camera which is also used for actual microscopy measurements is used for measuring the intensity.

14. Method according to claim 1,
wherein the microscope is a laser scanning microscope, a widefield microscope, or a light sheet microscope.

15. Microscope for examining a sample, comprising:
at least one light source for emitting illumination light,
at least one microscope objective for guiding the illumination light onto the sample and
optical means for guiding detection light from the sample onto a camera,
a phase mask arranged in an excitation beam path and/or a detection beam path,
the camera for measuring light in the detection beam path and
a control and evaluation unit for actuating the phase mask and the camera and for evaluating light measured by the camera,
wherein
the control and evaluation unit is set up for
actuating the phase mask successively with different patterns of grey levels, wherein a first grey level of a first partial quantity of segments remains constant, and wherein a second grey level of a second partial quantity of segments is varied from one pattern to the next pattern,
actuating the camera for measuring at least one part of the entire intensity of the light in the detection beam path downstream of the phase mask for the different patterns,
forming a characteristic of the measured intensity in dependence on the second grey level,
obtaining a relationship between the second grey level and a phase shift, which is imprinted by the phase mask, from the characteristic and calibrating an actuation of the phase mask on the basis of the obtained relationship between grey level and phase shift,
wherein a special fluorescent sample for the calibration measurements is present for the measurements for the calibration and/or
an object carrier for holding the sample or a cover slip is present and light reflected at said object carrier or at said cover slip is used for the measurements for the calibration.

16. Microscope according to claim 15,
wherein
the phase mask is arranged in a plane that is optically conjugate to a sample plane.

17. Microscope according to claim 15,
wherein
the phase mask is arranged in a plane that is optically conjugate to a rear objective pupil and is used in particular both by the excitation beam path and the detection beam path.

18. Microscope according to claim 15,
wherein
a stop for blocking light of the zero order of diffraction is present downstream of the phase mask.

19. Microscope according to claim 15,
wherein
a stop for blocking the light of orders of diffraction greater than 0 is present.

20. Microscope according to claim 15,
wherein
the phase mask is a 2D phase mask with pixel rows and pixel lines.

21. Microscope according to claim 15,
wherein
the phase mask is a spatial light modulator.

22. Microscope according to claim 15,
wherein
a separate beam deflection means is present to guide the illumination light used for the measurements for the calibration to the camera.

* * * * *